June 16, 1925. 1,542,548
D. E. GORDON
HOISTING IMPLEMENT
Filed Nov. 8, 1923
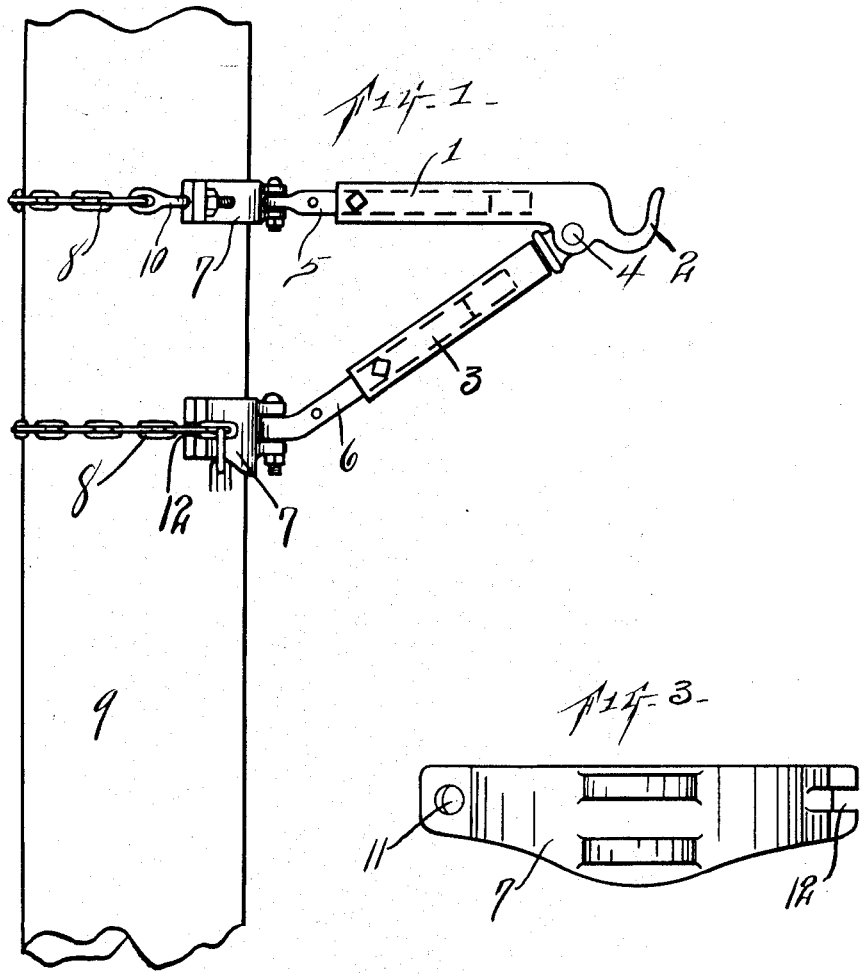
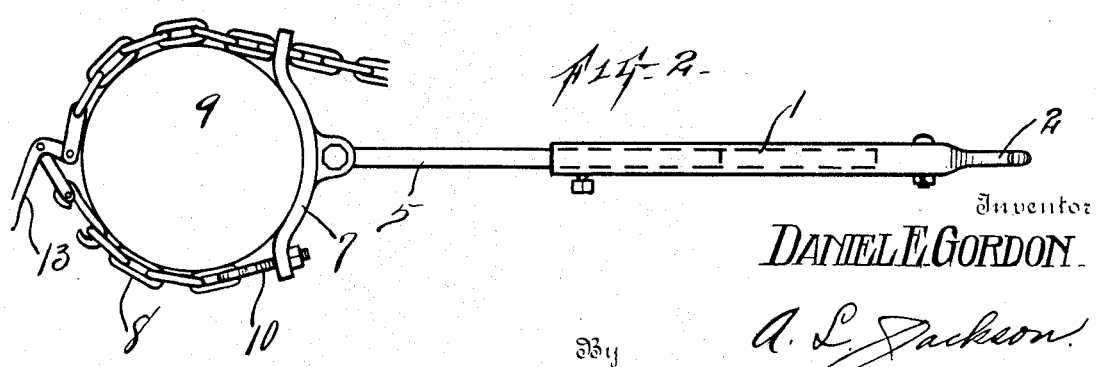
Inventor
DANIEL E. GORDON
By A. L. Jackson
Attorney Patented June 16, 1925.

1,542,548

UNITED STATES PATENT OFFICE.

DANIEL E. GORDON, OF FORT WORTH, TEXAS.

HOISTING IMPLEMENT.

Application filed November 8, 1923. Serial No. 673,458.

*To all whom it may concern:*

Be it known that I, DANIEL E. GORDON, a citizen of the United States, residing at Fort Worth, in the county of Tarrant and State of Texas, have invented certain new and useful Improvements in Hoisting Implements, of which the following is a specification.

This invention relates to a hoisting implement, and more particularly to an implement that may be temporarily attached to any object to assist in hoisting objects as for attaching to a telephone or electric poles for hoisting transformers and the like. The object of this invention is to construct an implement that will be durable and cheaply manufactured and may be readily attached to any size of object or pole. Another object is to so construct the implement that it may be used to hoist objects to different positions without removing its position upon the pole by swinging the main portion from one place to the other horizontally. Other objects and advantages will be fully explained in the following description and the invention will be more particularly pointed out in the claims.

Reference is had to the accompanying drawings which form a part of this application.

Fig. 1 is a side view of the implement, as it would appear when attached to a pole.

Fig. 2 is a plan view of the same showing means for tightening the chains around a pole.

Fig. 3 is a face view of one of the brackets that supports the hoisting arms and the chains.

This device or implement comprises a main hoisting arm 1 with a hook 2 for holding a block and tackle, line, or other objects for hoisting purposes and is supported or braced by an arm 3 which is pivoted at 4 so that it may brace the arm 1 from any angle vertically. The arms 1 and 3 telescope on the auxiliary arms 5 and 6 respectively to vary the distance, that they may be used, from post or support. The arms 1 and 3 are supported by a base or brackets 7, their auxiliary arms being pivotally connected to the brackets 7 which carries chains 8 or lines for wrapping around and fastening to a post or other object 9. The ends of the chains 8 are attached to the brackets 7 by a bolt 10 which runs through the opening 11 of the brackets 7 and wraps around the object or post 9 that is to support the device and the other end may run through an opening or slot 12 of the brackets 7. There may be used a tightening device or boomer 13 on the chains 8 for taking up slack and tightening the chains 8 around the post 9, as shown in Fig. 2.

What I claim is—

1. A hoisting implement comprising a pair of brackets for engaging a post or upright object, chains caught in the ends of said brackets and means for adjusting the chains on said post for binding said brackets to a post, a telescopic hoisting arm provided with a hook on the outer end thereof and means for pivotally connecting the inner end to one of said brackets for permitting a horizontally swinging motion of the arm, a telescopic bracing arm pivotally connected to said hoisting arm, and means for pivotally connecting said bracing arm to the other bracket for permitting a horizontal swinging motion of the bracing arm.

2. A hoisting implement comprising upper and lower brackets for engaging an upright post, chains and means for adjusting said chains on said post for binding said brackets on a post, a hoisting arm provided with a hook on its outer end and composed of two parts telescopically connected together and means for pivotally connecting the inner member of said arm to said upper bracket, means for fixedly connecting said telescopic parts together, a bracing arm composed of telescopic members, one member being pivotally connected to said hoisting arm and the other member pivotally connected to said lower bracket, and means for fixedly connecting said telescopic members together.

In testimony whereof I set my hand this 2nd day of November, 1923.

DANIEL E. GORDON.